(12) United States Patent
Versteyhe et al.

(10) Patent No.: US 9,956,966 B2
(45) Date of Patent: May 1, 2018

(54) VEHICLE AND OPERATOR GUIDANCE BY PATTERN RECOGNITION

(71) Applicant: DANA LIMITED, Maumee, OH (US)

(72) Inventors: Mark R. J. Versteyhe, Oostkamp (BE); Thibaut E. Duchene, Woluwe-Saint Lambert (BE)

(73) Assignee: Dana Limited, Maumee, OH (US)

( * ) Notice: Subject to any disclaimer, the term of this patent is extended or adjusted under 35 U.S.C. 154(b) by 0 days. days.

(21) Appl. No.: 14/392,094

(22) PCT Filed: Apr. 11, 2014

(86) PCT No.: PCT/US2014/033753
§ 371 (c)(1),
(2) Date: Oct. 7, 2015

(87) PCT Pub. No.: WO2014/169182
PCT Pub. Date: Oct. 16, 2014

(65) Prior Publication Data
US 2016/0075339 A1    Mar. 17, 2016

Related U.S. Application Data

(60) Provisional application No. 61/811,264, filed on Apr. 12, 2013.

(51) Int. Cl.
*B60W 50/00* (2006.01)
*G05D 1/02* (2006.01)
(Continued)

(52) U.S. Cl.
CPC ........ *B60W 50/0097* (2013.01); *B60W 50/08* (2013.01); *B60W 50/14* (2013.01);
(Continued)

(58) Field of Classification Search
CPC ...... B60W 50/00; B60W 50/14; B60W 10/06; B60W 10/18; B60W 10/20;
(Continued)

(56) References Cited

U.S. PATENT DOCUMENTS 5,999,872 A    12/1999    Kinugawa et al.
6,879,969 B2    4/2005    Engstrom et al.
(Continued)

FOREIGN PATENT DOCUMENTS

CN    1168942 A    12/1997
CN    101002239 A    7/2007
(Continued)

OTHER PUBLICATIONS

European Patent Office; The International Search Report and Written Opinion; dated Nov. 13, 2014; 12 pages; European Patent Office, Rijswijk, Netherlands.
(Continued)

*Primary Examiner* — Anne M Antonucci
*Assistant Examiner* — Sanjeev Malhotra
(74) *Attorney, Agent, or Firm* — Marshall & Melhorn, LLC

(57) ABSTRACT

A method of vehicle and operator guidance by pattern recognition begins with collecting data on vehicle and operator patterns through sensors. The collected data is combined and analyzed with a pattern recognition algorithm. The combined and analyzed data is compared with patterns in a pattern database. If data matches a pattern in the pattern database, the pattern can be selected. If the data does not match a pattern in the pattern database, a new pattern can be created and selected. Based on the selected pattern, a determination is made to passively assist the operator, selectively assist the operator or passively and actively assist the operator. The determined action is then implemented.

17 Claims, 4 Drawing Sheets

(51) Int. Cl.
*B60W 50/08* (2012.01)
*B60W 50/14* (2012.01)
*B66F 9/24* (2006.01)
*G09B 19/16* (2006.01)

(52) U.S. Cl.
CPC ............. *B66F 9/24* (2013.01); *G05D 1/0221* (2013.01); *B60W 2050/0089* (2013.01); *B60W 2050/0095* (2013.01); *B60Y 2200/15* (2013.01); *G05D 2201/0216* (2013.01); *G09B 19/167* (2013.01)

(58) Field of Classification Search
CPC . B60W 2050/0071; B60W 2050/0073; B60W 2050/0078; B60W 2550/402; B60W 30/02; B60W 30/04; B60W 30/14; B60W 30/16; B60W 30/18154; B60W 30/18172; B60W 40/06; B60W 40/072; B60W 40/076; G05D 1/02; G05D 1/0221; G05D 1/0225; G05D 1/0246; G05D 1/0257; G05D 1/027; G05D 1/0274; G05D 1/0278; G05D 2201/0213; G08G 1/161; G08G 1/163; G08G 1/164; G08G 1/165; G08G 1/166; G08G 1/167; G01S 13/931; G01S 17/023; G01S 2013/9321; G01S 2013/9332; G01S 2013/9339; G01S 2013/9342; G01S 2013/9346; G01S 2013/935; G01S 2013/9353; G01S 2013/9357; G01S 2013/936; G01S 2013/9375; G01S 2013/9382; G01S 13/865; G01S 13/867; G01S 17/89; G01S 19/42; G01S 19/50; G01S 19/17; B60L 11/14; B60L 11/803; B60L 11/182; B60L 11/1824; B60L 11/1833; B60L 11/1835; B60L 11/1842; B60L 11/1846; B60L 11/1877; B60L 2200/12; B60L 2200/22; B60L 2210/30; B60L 2210/40; B60L 2230/16; B60L 2240/36; B60L 2240/525; B60L 2250/16; B60L 2270/147; B60L 2270/32; B60L 2270/34; B60L 3/003; B60L 3/0038; B60L 3/0046; B60L 3/04; B60N 2/2863; G01D 5/2006; G01N 27/725; G01V 3/10
USPC ........... 701/408, 468, 532; 700/20; 704/211; 340/903, 990; 348/118; 307/104; 324/239; 382/159
See application file for complete search history.

(56) References Cited

U.S. PATENT DOCUMENTS

| | | | |
|---|---|---|---|
| 7,349,767 B2 | 3/2008 | Kuge et al. | |
| 7,389,178 B2 | 6/2008 | Raz et al. | |
| 7,444,311 B2 | 10/2008 | Engstrom et al. | |
| 7,496,545 B2 | 2/2009 | Chung | |
| 7,555,367 B2 | 6/2009 | Kuge | |
| 7,778,742 B2 | 8/2010 | Kuge et al. | |
| 7,826,970 B2 | 11/2010 | Kobayashi et al. | |
| 7,912,796 B2 | 3/2011 | Engstrom et al. | |
| 2003/0093187 A1* | 5/2003 | Walker | B64C 13/20 701/1 |
| 2005/0125148 A1* | 6/2005 | Van Buer | G01C 21/3617 701/468 |
| 2005/0162513 A1* | 7/2005 | Chan | G07C 5/085 348/118 |
| 2005/0273215 A1 | 12/2005 | Kuge | |
| 2006/0155394 A1* | 7/2006 | Syeda-Mahmood | G06K 9/00496 700/20 |
| 2007/0012499 A1 | 1/2007 | Kobayashi et al. | |
| 2009/0030605 A1* | 1/2009 | Breed | B60N 2/2863 701/532 |
| 2009/0140887 A1* | 6/2009 | Breed | G01C 21/165 340/990 |
| 2010/0052945 A1* | 3/2010 | Breed | B60N 2/2863 340/903 |
| 2013/0054133 A1* | 2/2013 | Lewis | G01C 21/3407 701/423 |
| 2014/0015329 A1* | 1/2014 | Widmer | G01D 5/2006 307/104 |
| 2014/0015522 A1* | 1/2014 | Widmer | G01D 5/2006 324/239 |
| 2014/0032017 A1* | 1/2014 | Anderson | B60W 30/09 701/3 |
| 2014/0229167 A1* | 8/2014 | Wolff | G10L 21/045 704/211 |
| 2015/0235109 A1* | 8/2015 | Yoshii | G06K 9/6255 382/159 |
| 2016/0054140 A1* | 2/2016 | Breed | G01C 21/3611 701/408 |

FOREIGN PATENT DOCUMENTS

| | | |
|---|---|---|
| CN | 1954303 A | 4/2008 |
| CN | 101169873 A | 4/2008 |
| CN | 101353017 A | 1/2009 |
| CN | 101633357 A | 1/2010 |
| CN | 101633359 A | 1/2010 |
| CN | 102666262 A | 9/2012 |
| CN | 102826084 A | 12/2012 |
| CN | 102991503 A | 3/2013 |
| EP | 1544071 A1 | 6/2005 |
| EP | 1602542 A1 | 12/2005 |
| EP | 1743818 A1 | 1/2007 |
| JP | 2001-142506 A | 5/2001 |
| JP | 2002-181179 A | 6/2002 |
| JP | 2006347535 A | 12/2006 |
| JP | 200778116 A | 3/2007 |
| JP | 200942051 A | 2/2009 |

OTHER PUBLICATIONS

Machine-generated English translation of JP2001-142506, obtained via Japan Platform for Patent Information.
Japanese Office Action for Application No. 2016-507677, dated Sep. 20, 217.
Machine-generated English translation of JP2002-181179, obtained via Japan Platform for Patent Information.
Machine-generated English translation of CN101353017, obtained via Espacenet Patent Search.
Chinese Office Action for Application No. 201480017798.9, dated Dec. 2, 2016.

* cited by examiner ic # VEHICLE AND OPERATOR GUIDANCE BY PATTERN RECOGNITION

RELATED APPLICATIONS

This application claims priority from and the benefit of U.S. Patent Application Ser. No. 61/811,264 filed on Apr. 12, 2013, which is incorporated by reference in its entirety herein.

TECHNICAL FIELD

Vehicle productivity and operator comfort can be improved by recognizing repetitive patterns for the vehicle, vehicle components and/or the operator. When a pattern is recognized, active and/or passive actions can be taken to improve productivity and comfort.

BACKGROUND

Certain vehicles may be operated in a repetitive pattern in a typical duty cycle. For example, the vehicle operator may use the vehicle to perform the same actions or movements or to repeatedly follow the same route. Vehicles such as wheel loaders, forklifts and the like are typical examples of off-highway vehicles that may be operated in this fashion. It can be appreciated that the vehicle performs the same actions in these cycles, but the components of the vehicle and operator may as well. It would increase efficiency and productivity of the vehicle and the operator if these patterns could be recognized and then implemented into the vehicle control so that the control was anticipated.

SUMMARY OF THE PRESENT DISCLOSURE

A method of vehicle and operator guidance by pattern recognition begins with collecting data on vehicle and operator patterns through sensors. The collected data is combined and analyzed with a pattern recognition algorithm. The combined and analyzed data is compared with patterns in a pattern database. If data matches a pattern in the pattern database, the pattern can be selected. If the data does not match a pattern in the pattern database, a new pattern can be created and selected. Based on the selected pattern, a determination is made to passively assist the operator, actively assist the operator or passively and actively assist the operator. The determined action is then implemented.

BRIEF DESCRIPTION OF THE DRAWINGS

Exemplary embodiments of the present disclosure will now be described by way of example with reference to the accompanying drawings, in which.

DETAILED DESCRIPTION OF EXEMPLARY EMBODIMENTS

Operator comfort and vehicle productivity can be improved if the repetitive patterns or movements of the operator and/or vehicle are recognized. For example, operator comfort and/or vehicle productivity might be improved if the vehicle control parameters can be adapted to recognize the repetitive patterns or movements. Some of the vehicle control parameters that may be advantageously adapted to the repetitive patterns or movements include, but are not limited to, pre-fill phases in clutches, pre-engagement of a gear before it is selected, control of the bucket of a wheel loader (such as bucket leveling) or the forks and mast of a forklift.

Figure 1:
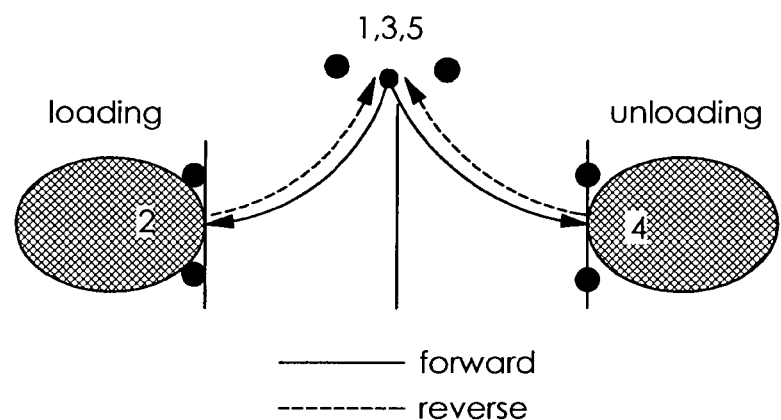
FIG. 1 schematically depicts one embodiment of a short Y-cycle for a wheel loader.
Figure 2:
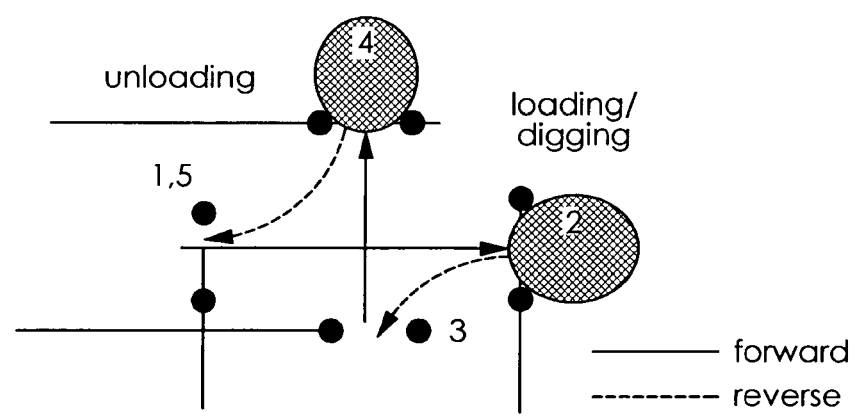
FIG. 2 schematically depicts one embodiment of a bank digging cycle for a wheel loader.

The patterns can represent repetitive movements of the vehicle, similar to the ones followed by a wheel loader when loading and unloading soil. FIG. 1 and FIG. 2 show two typical loading and unloading patterns for a wheel loader. The pattern in FIG. 1 is a short Y-cycle. The pattern in FIG. 2 is a bank digging-cycle.

As suggested above, the repetitive patterns are not limited to just movements of the entire vehicle. The patterns might also be repetitive movements made by some machine components (i.e. working functions), such as the bucket of a wheel loader or the mast and forks of a forklift.

Figure 3:
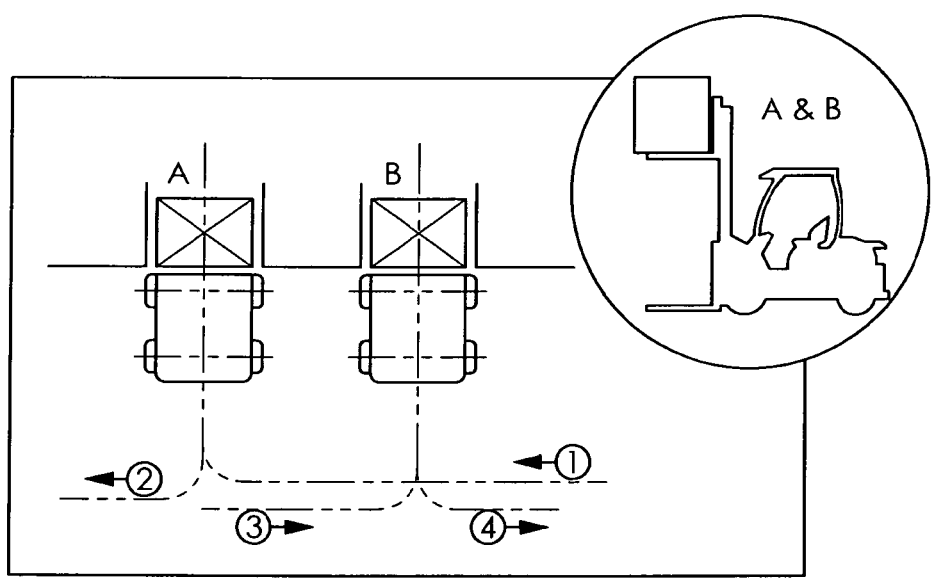
FIG. 3 schematically depicts one embodiment of a forklift duty cycle.

By way of example, FIG. 3 depicts a typical pattern for a forklift. A forklift operator will typically follow a certain list of actions to pick a load. These actions usually include slowly approaching the load, adjusting the mast angle, fork position and fork width, inserting the forks under the load, raising the forks, tilting the mast with a certain angle backwards, driving in reverse and so on.

The numbers, arrows, labels and different line types in FIGS. 1, 2 and 3 convey the typical patterns represented in each Figure.

Once the pattern is recognized, many actions might be taken, such as passive actions (e.g., pre-engaging certain clutches), to active actions (e.g., to guide the driver actions or even complete automation of a pattern).

Figure 4:
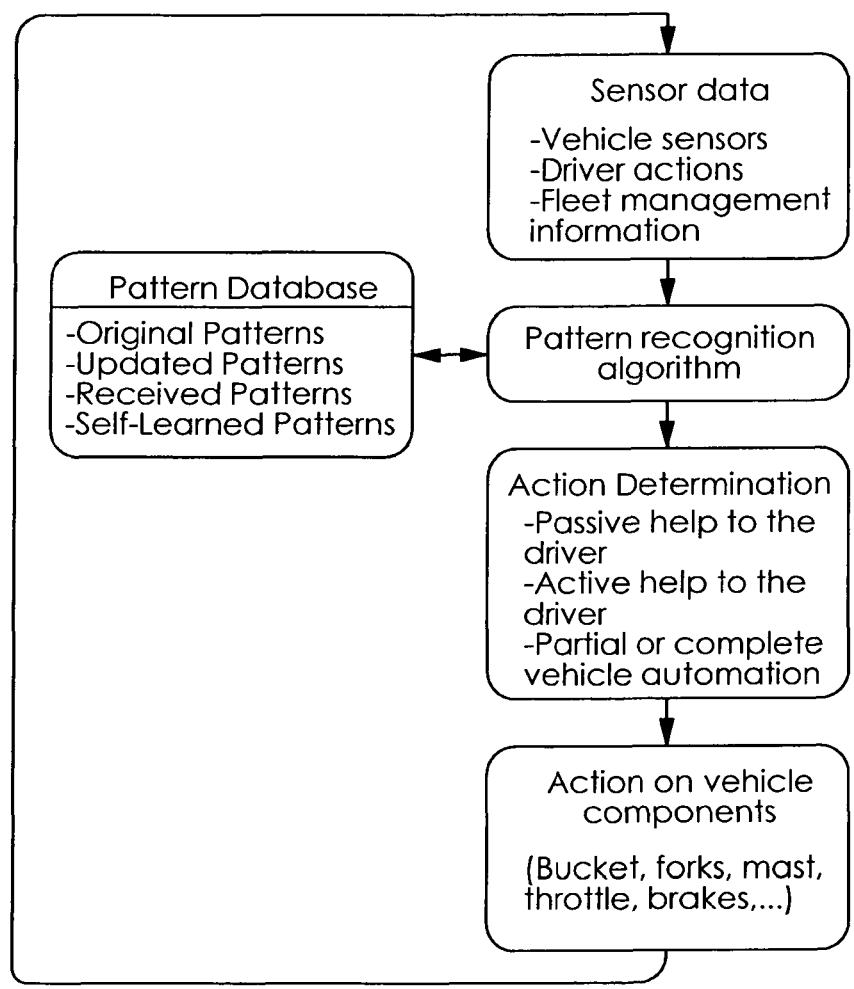
FIG. 4 is a chart schematically depicting one embodiment of steps for vehicle and operator guidance by pattern recognition.

FIG. 4 generally shows one embodiment for pattern recognition. The vehicle is outfitted with various sensors. The sensors can be generally categorized as vehicle sensors, sensors for driver actions and fleet management sensors.

Figure 5:
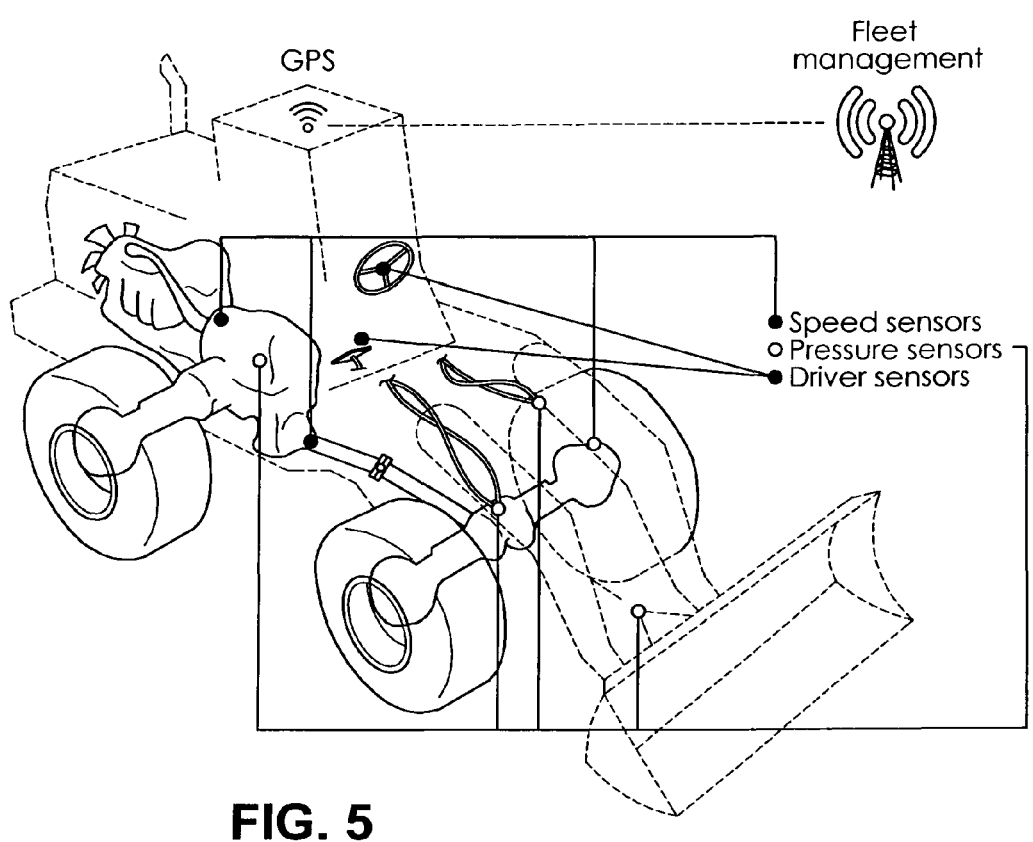
FIG. 5 schematically depicts one embodiment of a vehicle outfitted with various sensors referred to in FIG. 4.

Examples of vehicle sensors comprise internal combustion engine speed sensors, wheel speed sensors, pressure sensors for the clutches and the hydraulic cylinders, and load sensors on the fork lift mast, among others. Examples of sensors for driver actions comprise sensors for the position of the steering, pressure applied on the throttle, and position or angle of the levers and joysticks. Examples of fleet management sensors comprise sensors to collect and process GPS data for vehicle positioning, positions and actions from other vehicles, actions to do, and location and weight of loads, among others. These sensors are depicted on one exemplary vehicle in FIG. 5.

The information collected from the vehicle sensors, the fleet management sensors and the driver action sensors are combined and processed by a pattern recognition algorithm. Using typical supervised learning algorithms, which covers the case where a set of data (i.e. training data) for the vehicle movements have been pre-defined (prior hand-labeling), the information retrieved by the sensors are labeled with the related classification of tasks. An example operation of such a vehicle, for instance soil digging, consists of several tasks in a sequence. The controller will try to match the actions interpreted via the sensors with the training data to achieve a sequence labeling. As a result of this recognition phase, the algorithm will determine which pattern is being followed by interpreting actions in a dimensionless set of data (left turn, right turn, move forward, raising a load, . . . ) using parametric classification methods.

Any number of pattern categories (i.e. sequence of tasks) can be stored in the internal memory of the vehicle controller to be classified based on the sensor input values. The CPU (i.e. the master vehicle controller) will execute the algorithms mentioned above. In case the pattern followed by the vehicle cannot be matched with the training data (i.e. already stored), by interpreting the repetitive motions in the clustered (un-labeled) data, a new structure of pattern (sequence of tasks) can be formed and taught to the machine (i.e. unsupervised machine learning).

In one embodiment, there may be four pattern categories: (1) the original patterns, (2) the updated patterns, (3) the patterns received from fleet management and (4) the self-learned patterns.

Original patterns may be comprised of the pre-defined patterns (i.e. labeled training data) implemented by the control designer in an offline way (e.g., generic patterns), as shown in FIGS. 1, 2 and 3.

Updated patterns may be comprised of improvements on the original patterns based on existing (or newly installed) sensor measurements on the vehicle (e.g., weight of the load or distances taken on the route . . . ) learned during vehicle operation or operator operation.

Received patterns may be comprised of information received by a fleet management server and/or cloud (i.e., information from other vehicles or infrastructure) through a communication system installed on the vehicle. For example, an operation of a forklift, such as lifting a pallet from a truck in the warehouse entrance and storing it in a rack at a particular location can form a new label for the sequences of tasks and can be shared with all other vehicles of the fleet. As other vehicles learn the new pattern for the first time, they can properly operate the same sequence of tasks in replacement with the first vehicle by immediately recognizing the new pattern.

Self-learned patterns may be comprised of patterns not included in the originally installed patterns. The recognition algorithm can detect and record repetitive movements by the vehicle or the operator. A separate space on the vehicle memory is allocated to store all the new patterns followed by the vehicle, progressively. The controller will interpret this sequence of actions by clustering methods and these actions can form new labels by checking related parameters (e.g., how many times the action is repeated or the variation among each repetition etc.) assigned for each particular application. To limit the number of patterns in the database, the followed pattern might be compared first to the most frequently used patterns, and the less frequently used or non-used patterns can be removed from the database to ensure fast-response and the reliability of the pattern recognition algorithms.

The information from the sensors is compared with the pattern categories and the one that most closely matches the available pattern category is selected. Once the pattern category is selected, the related actions are determined depending on the strategy (e.g. passive assistance, active assistance or complete automation) and finally the desired actions are sent to the vehicle components for implementation. The related actions can include blending passive, active, or automation actions that may be taken in any order.

Each vehicle has at least one controller generally responsible for the control and operation of the machine and/or its various components. The vehicle controller will be responsible for recognizing the patterns to guide the driver and increase productivity. Many different ways of recognizing patterns can be implemented in the controller.

For example, the operator could enter new patterns manually in the "register mode", by executing a set of repetitive actions desired to be recorded. Once the patterns have been recorded into the memory, the controller can recognize them in following operations.

As yet another example, patterns can also be learned from external sources outside the vehicle, such as other vehicles of the fleet or from the fleet management server. Such a pattern management using telematics means might lead to a selection of the optimal pattern and a standardization of it by comparing patterns used by many operators.

Additionally, the telematics system can monitor and give instructions to the driver through a telematics platform, such as the next actions to be taken (e.g. to pick a load at a certain location). The addition of information received from the telematics system can improve the accuracy and reliability of the pattern recognition algorithms.

All these pattern recognition techniques are based on the analysis of the driver intentions (throttle, joystick and levers actuation, steering wheel, . . . ) and use the information from existing sensors (engine speed, wheel speed sensor, clutch pressure . . . ) and additional sensors (GPS for vehicle positioning, load sensor for determining the load in the bucket, . . . )

Once a pattern has been recognized, the actions to be taken vary depending on the circumstances. Examples of just a few potential actions are below. These can be combined together, used separately, use sequentially or in any pattern.

The driver can be assisted in a passive manner by preparing the vehicle for the anticipated next driver action once the pattern is recognized. For example, reverse gear can be pre-engaged on a forklift after the load is lifted, and/or the speed of the vehicle's internal combustion engine can be changed in anticipation of a patterned action.

The driver can be actively assisted to help control the vehicle. The actions under this pattern might comprise adjusting the vehicle speed to a level appropriate for the activity undertaken by the vehicle, the driver's actions and the vehicle pattern. It can also include actions on the bucket or mast and forks, and lowering the load easily as the driver touches the load lowering controls.

The invention may also assist the vehicle operator by standardizing his actions on the vehicle and the equipment depending on the pattern engaged. If the current motion matches with "the unloading of a truck" pattern, but if the driver is driving faster than the speed defined in the pattern, the controller could force the vehicle to reduce the speed to approach the speed usually followed in this pattern. The driver can still have priority on the control, meaning that, for example, if he presses again on the accelerator, the controller will stop managing its speed and the driver will be again fully in charge of the vehicle.

Additionally, the invention can comprise taking control of the vehicle by performing small parts of the pattern automatically (e.g., lower buckets, raise forks, . . . ) or the complete pattern (e.g., load some soil, move, unload and move back to the initial position).

In the case of automatic or semi-automatic vehicle control, safety measures have to be implemented to permit the pattern recognition to be terminated and to permit the driver to take full control of the vehicle and its components.

The advantages associated with the present invention over the prior art include, but are not limited to, increased productivity and increased driver comfort by anticipating the next actions and thus adapting the vehicle parameters accordingly.

What is claimed is:

1. A method of vehicle and operator guidance by pattern recognition, comprising:
   providing a vehicle with a controller;
   receiving data on vehicle and operator patterns through vehicle mounted sensors;
   combining and analyzing said received data with a pattern recognition algorithm;
   comparing said combined and analyzed data with patterns in a pattern database, wherein the controller either accepts the pattern if said combined and analyzed data matches a pattern in said pattern database or marks the combined and analyzed data as a new pattern not in said pattern database and accepts said new pattern into said pattern database;
   determining, based on said pattern or new pattern, to passively assist an operator, actively assist the operator or passively and actively assist the operator; and
   implementing the determined passive and/or active assistance,
   wherein said passive and/or active assistance includes preparing for the movement of or moving said vehicle or components of said vehicle,
   wherein said patterns in said pattern database comprise original patterns, updated patterns, received patterns and self-learned patterns, and
   wherein self-learned patterns are created by said pattern recognition algorithm implemented by the controller by detecting vehicle or operator movements through said vehicle mounted sensors, grouping sensed data into patterns, recording said patterns in said pattern database, and comparing said recorded patterns to determine similarity, wherein comparing said recorded patterns includes comparing recorded patterns first to patterns in said pattern database used most frequently.

2. The method of claim 1, wherein said vehicle mounted sensors comprise vehicle sensors, sensors for driver actions and fleet management system sensors.

3. The method of claim 1, wherein similar patterns are grouped and saved in the pattern database and unsimilar patterns are removed from the pattern database.

4. The method of claim 1, wherein said original patterns are preloaded into said pattern database.

5. The method of claim 1, wherein said updated patterns take original patterns and update them based measurements from said vehicle mounted sensors learned during vehicle operation or operator operation.

6. The method of claim 1, wherein said received patterns are not original to the pattern database, but received from other vehicles or a fleet management system by said vehicle mounted sensors.

7. The method of claim 6, wherein said received patterns are created by one or more fleet vehicles performing a repetitive operation and are shared with other fleet vehicles.

8. The method of claim 1, wherein an operator overrides the implemented determined passive and/or active assistance.

9. The method of claim 1, wherein new patterns are entered into said pattern database when said operator records a set of executed repetitive actions and wherein new patterns are stored in a separate space in said pattern database.

10. The method of claim 1, wherein passive assistance anticipates the next driver actions based on pattern recognition.

11. The method of claim 1, wherein active assistance initiates the next driver action based on pattern recognition.

12. The method of claim 11, wherein initiation of the next driver action includes one of pre-filling a clutch or pre-engagement of a gear.

13. The method of claim 1, wherein said pattern includes repetitive movements made by at least one of said components of said vehicle.

14. The method of claim 1, wherein vehicle components include a fork, a mast or a bucket.

15. A method of vehicle and operator guidance by pattern recognition, comprising:
   providing a vehicle with a controller;
   receiving data on vehicle and operator patterns through vehicle mounted sensors;
   combining and analyzing said received data with a pattern recognition algorithm;
   comparing said combined and analyzed data with patterns in a pattern database, wherein the controller either accepts the pattern if said combined and analyzed data matches a pattern in said pattern database or marks the combined and analyzed data as a new pattern not in said pattern database and accepts said new pattern into said pattern database;
   determining, based on said pattern or new pattern, to passively assist an operator, actively assist the operator or passively and actively assist the operator; and
   implementing the determined passive and/or active assistance,
   wherein said passive and/or active assistance includes preparing for the movement of or moving said vehicle or components of said vehicle, and
   wherein implementing the determined passive and/or active assistance includes automatically taking control of components of said vehicle to perform passive and/or active assistance that completes said pattern or a portion thereof.

16. The method of claim 15, wherein passive and/or active assistance includes pre-engaging at least one of said components of said vehicle.

17. The method of claim 15, wherein components of said vehicle include a fork, a mast or a bucket.

* * * * *